US012223057B1

(12) United States Patent
Cline (10) Patent No.: US 12,223,057 B1
(45) Date of Patent: Feb. 11, 2025

(54) RISK MODELING FOR CYBERSPACE CONTROL IMPLEMENTATION DEFICIENCIES

(71) Applicant: Hitrust Services Corp., Frisco, TX (US)

(72) Inventor: Bryan Cline, Frisco, TX (US)

(73) Assignee: HITRUST SERVICES CORP., Frisco, TX (US)

( * ) Notice: Subject to any disclaimer, the term of this patent is extended or adjusted under 35 U.S.C. 154(b) by 212 days.

(21) Appl. No.: 17/862,661

(22) Filed: Jul. 12, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 11,550,924 | B2* | 1/2023 | Hamby | G06F 21/577 |
| 2010/0162401 | A1* | 6/2010 | Sakaki | G06Q 10/10 726/25 |
| 2020/0394314 | A1* | 12/2020 | Hamby | G06F 21/577 |
| 2021/0216928 | A1* | 7/2021 | O'Toole | G06F 16/29 |
| 2021/0312058 | A1* | 10/2021 | Chiarelli | G06Q 10/067 |
| 2022/0215102 | A1* | 7/2022 | Shakarian | G06F 21/577 |
| 2022/0400135 | A1* | 12/2022 | Gamra | H04L 63/1433 |

\* cited by examiner

*Primary Examiner* — Baotran N To
(74) *Attorney, Agent, or Firm* — CRGO Global; Steven M. Greenberg (57) ABSTRACT

Risk modeling for cyberspace control deficiencies includes characterizing a subject organization and loading a baseline set of controls, each control mapping to one or more threats to the subject organization. For each of the threats, a baseline risk value is computed from a hypothetical implementation of the baseline set of controls. Concurrently, risk assessment data is uploaded for the subject organization and an implemented set of controls for the organization extracted therefrom. For each of the threats, one or more of the implemented set of controls are mapped thereto and a risk value computed. Thereafter, the baseline risk value compared to the computed risk value producing a risk deficit value. On condition that the risk deficit value exceeds a threshold value, a flag is written in association with the risk assessment data indicating a necessity to modify the implemented set of controls.

18 Claims, 3 Drawing Sheets

RISK MODELING FOR CYBERSPACE CONTROL IMPLEMENTATION DEFICIENCIES

BACKGROUND OF THE INVENTION

Field of the Invention

The present invention relates to the technical field of organizational risk assessment for cybersecurity threats and more particularly to the quantitative modeling of specific risk to an organization relative to a baseline risk for similar types of organizations.

Description of the Related Art

Organizational risk remains part and parcel of the general operation of an organization. Organizational risk comes in many forms and generally maps a particular threat to an impact of the threat should the threat materialize. Threats in general refer to any prospective adverse event impacting the operation of the organization and is most often thought of in terms of a cost of the materialization of the threat as compared to the cost to avoid the materialization of the threat. In respect to cybersecurity, generally the threats are viewed in terms of both malicious and inadvertent breaches of the integrity of the computing infrastructure of an organization and the data managed thereon.

It is the controls implemented by the organization that are intended to avoid the materialization of such threats, the controls generally referring to internal protocols for avoiding the materialization of the threats, such as good operational policy for the members of the organization, and also tools and devices deployed within the computing infrastructure of the organization designed to either avoid the materialization of a threat, or to lessen or cure the impact of the materialization of the threat. Naturally, there is some indirect cost to implementing controls in the form of organizational policies including the necessary allocation of human resources, which can translate directly into a budgetable cost to the organization. As well, there is a direct cost to acquiring and deploying devices and computer programs into the computing infrastructure so as to achieve those types of controls necessary to avoid the materialization of a threat or the realization of the impact resulting from the materialization of a threat.

At present, methods are known to quantitatively, or semi-quantitatively assess cyberspace risk to an organization such that each known threat, such as data leakage or malicious intrusion, is assigned a numeric value reflecting a probability of the occurrence of the risk despite countervailing controls implemented by the organization. These types of models, however, fare poorly in conveying to the lay person the connection between the arbitrary units accorded to the modeled risk and the real world cost of the risk and the controls necessary to avoid the risk. As well, these types of models do not account for the different risks for different types of organizations and the different costs of the materialization of those risks for the different types of organizations.

To wit, where a threat to one type of organization may be great and the cost of materialization catastrophic, to another type of organization, that same threat may be much less likely and the cost manageable. Therefore, applying a generic model to all organizations irrespective of characterization can result in a blurry picture of actual risk to a subject organization. Worse, the application of a generic model to a subject organization in of itself does not provide the necessary managerial intelligence of the cost of the contingency should a threat materialize despite an implemented set of controls relative to the cost of modifying the set of controls to avoid the materialization of the threat.

BRIEF SUMMARY OF THE INVENTION

Embodiments of the present invention address technical deficiencies of the art in respect to risk modeling of cyberspace threats to an organization and the evaluation of a set of implemented controls for effectiveness against known threats to the organization. To that end, embodiments of the present invention provide for a novel and non-obvious method for risk modeling for cyberspace control deficiencies. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for risk modeling for cyberspace control deficiencies includes the establishment of a communicative connection with a database which stores threat assessment data that has been mapped to different controls. Within the database, each control corresponds to one or more threats, and each control has an association in the database with one or more different characterizations of an organization, such as organization type, industry, classification, size or location, or any combination thereof. The method further includes a specification of a particular organization to be subjected to risk modeling and the characterization of the particular organization according to one of the different characterizations set forth hereinabove. Then, a baseline set of controls may be loaded into memory from the database, the baseline set of controls having been mapped to respectively different threats for the one of the different characterizations. For each correspondingly different threat, a baseline risk value may then be computed from a hypothetical implementation of the set of controls for the different characterizations for correspondingly different ones of the threats.

The method then includes uploading risk assessment data for the particular organization and extracting from the risk assessment data, an implemented set of controls for the particular organization. For each corresponding threat, one more implemented set of controls are mapped to each corresponding threat according to the mappings of the threats to the baseline set of controls in the database, and a risk value can be computed for the particular organization based upon the mapped ones of the implemented set of controls. Thereafter, the computed risk value may be written to a risk register in the memory in connection with the particular organization. Finally, the baseline risk value may be compared to the computed risk value in the risk register so as to produce a determined risk deficit value for the current state. The determined risk deficit value then is written to the risk register, and to the extent that the determined risk deficit value exceeds a threshold value, in response, a flag is written to the memory in association with the risk assessment data. Optionally, a monitoring process monitors the risk register in the memory to detect the writing of the determined risk deficit value and upon detecting the writing of the determined risk deficit value, performs the response to the determined risk deficit value exceeding the threshold value In one aspect of the embodiment, each of the baseline risk value, the computed risk value, and the determined risk deficit value, as well as the threshold value, may be dollar values. To that end, the threshold value can be proportionate to a dollar value in a budget record for the particular organization.

In another aspect of the embodiment, the method additionally includes the receipt of an update to the implemented set of controls and responding to the received update by updating the computed risk value, and performing a new comparison of the baseline risk value to the computed risk value with the update so as to produce an updated risk deficit value for the current state. Then, in response to the updated risk deficit value having been determined to have exceeded the threshold value, a new flag may be written to the memory in association with the risk assessment data. But, otherwise, a previously written flag may be cleared in the memory on the condition that the updated risk deficit value has been determined to have fallen below the threshold value.

Finally, in yet another aspect of the embodiment, a target risk value may be selected based upon a hypothetical, future set of implemented controls, and the computed risk value then replaced with the selected target risk value. As well, the baseline value can be replaced with the current state value. Then, each corresponding one of the treats is mapped to one or more controls of the hypothetical set of the implemented controls and the computed risk value may be re-computed for the specified organization based upon the foregoing mappings so that and comparing the baseline value as replaced with the current state value with the re-computed risk value in order to produce a new risk deficit value. Subsequently, the new risk deficit value is compared with a projected cost to implement the specified set of implemented controls. Finally, in response to the new risk deficit value having been determined to have exceeded the projected cost, a new flag can be written to the memory in association with the risk assessment data. But otherwise an update is written to a financial planning database with the projected cost to implement the specified set of implemented controls.

In another embodiment of the invention, a data processing system is adapted for risk modeling for cyberspace control deficiencies. The system includes a host computing platform that one or more computers, each with memory and one or processing units including one or more processing cores. The system also includes a database that stores threat assessment data mapped to different controls, each of the controls corresponding to one or more threats, and each of the different controls having an association in the database with one or more different characterizations of an organization. The system yet further includes a risk modeling module. The module includes computer program instructions enabled while executing in the memory of at least one of the processing units of the host computing platform to perform risk modeling for cyberspace control deficiencies.

Specifically, the program instructions specify a particular organization for risk modeling and then characterize the particular organization as a corresponding one of the different characterizations. The program instructions further load into the memory from the database a baseline set of controls that had previously been mapped to respectively different threats for the corresponding characterization. The program instructions even further compute, for each corresponding one of the different threats, a baseline risk value from a hypothetical implementation of the set of controls for the different characterizations for the corresponding one of the different threats. The program instructions additionally upload risk assessment data for the particular organization and extract from the risk assessment data, an implemented set of controls for the particular organization. Thereafter, the program instructions map, for each corresponding one of the threats, identified ones of the implemented set of controls that are mapped to the corresponding one of the threats in the baseline set of controls.

Once the controls have been mapped to the threats in the baseline set of controls, the program instructions compute a risk value for the particular organization based upon the mapped ones of the implemented set of controls. The program instructions further write the computed risk value to a risk register in the memory in connection with the particular organization. Importantly, the program instructions compare the baseline risk value to the computed risk value in the risk register in order to produce a determined risk deficit value for the current state so as to write the determined risk deficit value to the risk register. Finally, the program instructions respond to a determination that the risk deficit value exceeds a threshold value by writing a flag to the memory in association with the risk assessment data.

In this way, the technical deficiencies of the generic modeling of risk for cyberspace threats to an organization of specific characterization are overcome owing to comparison of the risk resulting from the deployment of a current state of controls for a subject organization to the risk resulting from the deployment of a hypothetical state of controls for an organization of similar characterization to the subject organization, and the reduction of each risk value and the cost of implementation of the hypothetical state of controls to a budgetable monetary value. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for risk modeling for cyberspace control deficiencies. In accordance with an embodiment of the invention, a baseline risk can be determined based upon a hypothetical set of controls extracted from a database based upon the mapping of a characterization of a subject organization and different controls in the database associated with the characterization. Then, risk assessment data for the subject organization can be processed to identify a current state of controls implemented for the subject organization. The threats assigned to each control of the hypothetical set are then compared to the threats accounted for by the controls of the current state in order to detect deficiencies. As a result, a risk value is assigned to the specific organization and recorded in connection with the organization based upon the detected deficiencies. For instance, the risk value can be determined as a function of a pre-determined cost of each of the threat or set of threats addressed by the deficient controls. Alternatively, the risk value can be determined as a function of a pre-determined numeric value for a degree of risk for each of the threat or set of threats addressed by the deficient controls. In a more complex embodiment, the risk value can be determined as a function of a pre-determined probability of occurrence of each of the threat or set of threats addressed by the deficient controls.

Then, a risk deficit value is determined from a comparison of the risk value assigned to the organization and a risk value known for the hypothetical state of controls and corresponding threats. As well, the risk deficit value can be converted to a monetary value and a cost of implementing the controls of the deficiency determined so that a cost benefit analysis can be recorded in connection with the organization. In this regard, a cost of implementing each control can be included in the database in connection with each control. As well, a cost of the impact of each threat should the threat materialize can be included in the database. In this way, it can be determined based upon a set of threats and controls addressing the threats whether or not the cost of implementation of the controls in the set exceeds the cost of the threats avoided by the controls by an acceptable threshold amount or so as to produce a threshold internal rate of return on the cost of implementation of the controls.

To the extent that the cost of implementation of the controls in the set is determined to exceed the benefit of avoidance of the threats by less than an acceptable threshold amount, an optimization process can select for removal from the control set, those of the controls which are most expensive to implement, yet avoid the least costly ones of the threats. As each of the controls selected for removal are removed from the set, the cost benefit analysis can be repeated for the remaining controls in the set and the process repeats until the cost of the threats addressed by the remaining controls exceeds the cost of the remaining controls by the acceptable threshold amount or so as to produce the acceptable threshold rate of return on the cost of implementation of the controls.

Figure 1:
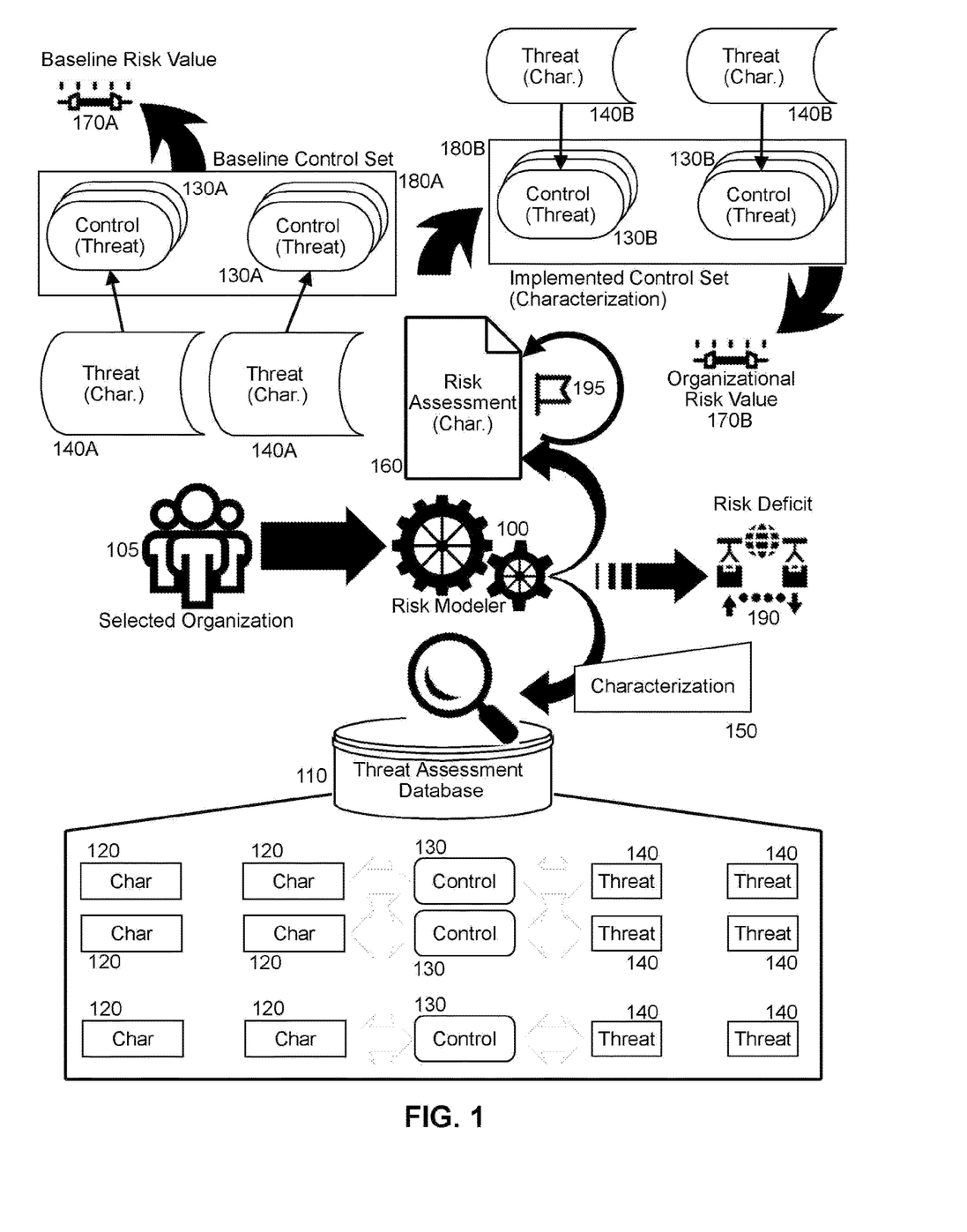
FIG. 1 is a pictorial illustration reflecting different aspects of a process of risk modeling for cyberspace control deficiencies.

In illustration of one aspect of the embodiment, FIG. 1 pictorially shows a process of risk modeling for cyberspace control deficiencies. As shown in FIG. 1, a threat assessment database 110 is populated with different organizational and system characterizations 120 such as type, industry, size or geography, different cyberthreats 140 to the organizations such as unauthorized intrusion, data leakage, data theft, denial of service attacks, phishing attacks, and the like, and different controls 130 directed at inhibiting the materialization of the threats 140. Each of the controls 130 in the threat assessment database 110 is related to one or more of the threats 140. As well, each of the controls 130 in the threat assessment database 110 is related to one or more of the organizational characterizations 120.

In this way, a querying of the threat assessment database 110 with a particular one of the characterizations 120 produces a set of the controls 130 related to the particular one of the characterizations 120. As well, a querying of the threat assessment database 110 with a particular one of the characterizations 120 produces a set of the threats 140 related to the particular one or more of the characterizations 120. Yet further, a querying of the threat assessment database 110 with a particular one of the threats 140 produces a set of one or more of the controls 130 against which the particular one of the threats 140 is directed. Finally, a querying of the threat assessment database 110 with a particular one of the controls 130 produces a set of one or more of the threats 140 against which the particular one of the controls 130 is directed.

In light of the structure of the threat assessment database 110, a risk modeler 100 receives a selection of an organization 105, typically a company or government agency. The risk modeler 100 characterizes the organization 105 to produce a characterization 150 artifact based upon a lookup of the title of the organization 105, or of an identifier of the organization 105. In this regard, the lookup can be performed by the risk modeler 100 in reference to a network connected query interface to a data source of characterizations of different organizations in terms of industry, type, size or geography and of different systems in terms of type or function, or the lookup can be performed by the risk modeler 100 in reference to an internal table of characterizations of different organizations. In either circumstance, the risk modeler 100 submits the result of the lookup as an organizational characterization 150 to the threat assessment database 110.

In response to the submission of the organizational characterization 150 to the threat assessment database 110, the risk modeler 100 receives in return a baseline control set 180A including a set of threats 140A related to the organizational characterization 150 and corresponding controls 130A adapted to avoid the materialization of the set of threats 140A. The risk modeler 100 then computes a baseline risk value 170A for the baseline control set 180A based upon an aggregation of risk values for each of the threats 140A depending upon the nature and degree of implementation (maturity) of the controls 130A deployed in contravention the threats 140A. To that end, a table can be provided including base values for each of the threats 140A should the threats 140A materialize, weighted downwardly based upon the presence of a threshold implementation (maturity) of one or more of the corresponding controls 130A, or upwardly based upon an absence of a threshold implementation (maturity) one or more of the corresponding controls 130A.

The risk modeler 100 then uploads an assessment document 160 for the organization 105 from which an implemented control set 180B is extracted. The implemented control set 180B includes one or more controls 130B deployed by the organization 105 in contravention of one or more corresponding threats 140B typically faced by the organization 105 according to the organizational characterization 150. Again, the risk modeler 100 computes an organizational risk value 170B for the implemented control set 180B based upon an aggregation of risk values for each of the threats 140B depending upon the nature of the controls 130B deployed in contravention the threats 140B. The risk modeler 100 than compares the baseline risk value 170A to the organizational risk value 170B in order to compute a risk deficit 190 (or surplus).

The risk modeler 100 then writes the organizational risk value 170B to a risk registry (not shown) of the organization 105 in connection with the risk assessment 160. To the extent that the risk modeler 100 determines that the risk deficit 190 indicates a greater organizational risk value 170B than the baseline risk value 170A by the acceptable threshold amount or so as to produce an acceptable threshold rate of return on the cost of implementation of the controls, each of which may be expressed in terms of a monetary cost of the impact of one or more of the threats 140B should the threats 140B materialize, the risk modeler 100 additionally writes the risk deficit 190 to the risk registry. As well, on the condition that the risk deficit 190 is determined by the risk modeler 100 to exceed an acceptable threshold value, such as a monetary value which is proportional to a budgeted line item for the organization 105 such as a budgeted revenue line item or an budgeted information technology expenditure line item, the risk modeler 100 writes a flag 195 to the risk registry indicating a necessity of review to an administrator of the risk assessment document 160.

Optionally, subsequent to the computation of the organizational risk value 170B, the risk modeler 100 receives an update to the implemented control set 180B. In response to the update, the risk modeler 100 updates the computations of the organizational risk value 170B and performs a new comparison of the baseline risk value 170A to the re-computed organizational risk value 170B so as to produce an updated form of the risk deficit 190. Then the risk modeler 100 responds to the updated risk deficit 190 exceeding the threshold value by writing a new instance of the flag 195 to the risk registry in association with the risk assessment document 160. On the other hand, the risk modeler 100 responds to the updated risk deficit 190 falling below the threshold value by clearing the previously written instance of the flag 195 in the risk registry.

Figure 2:
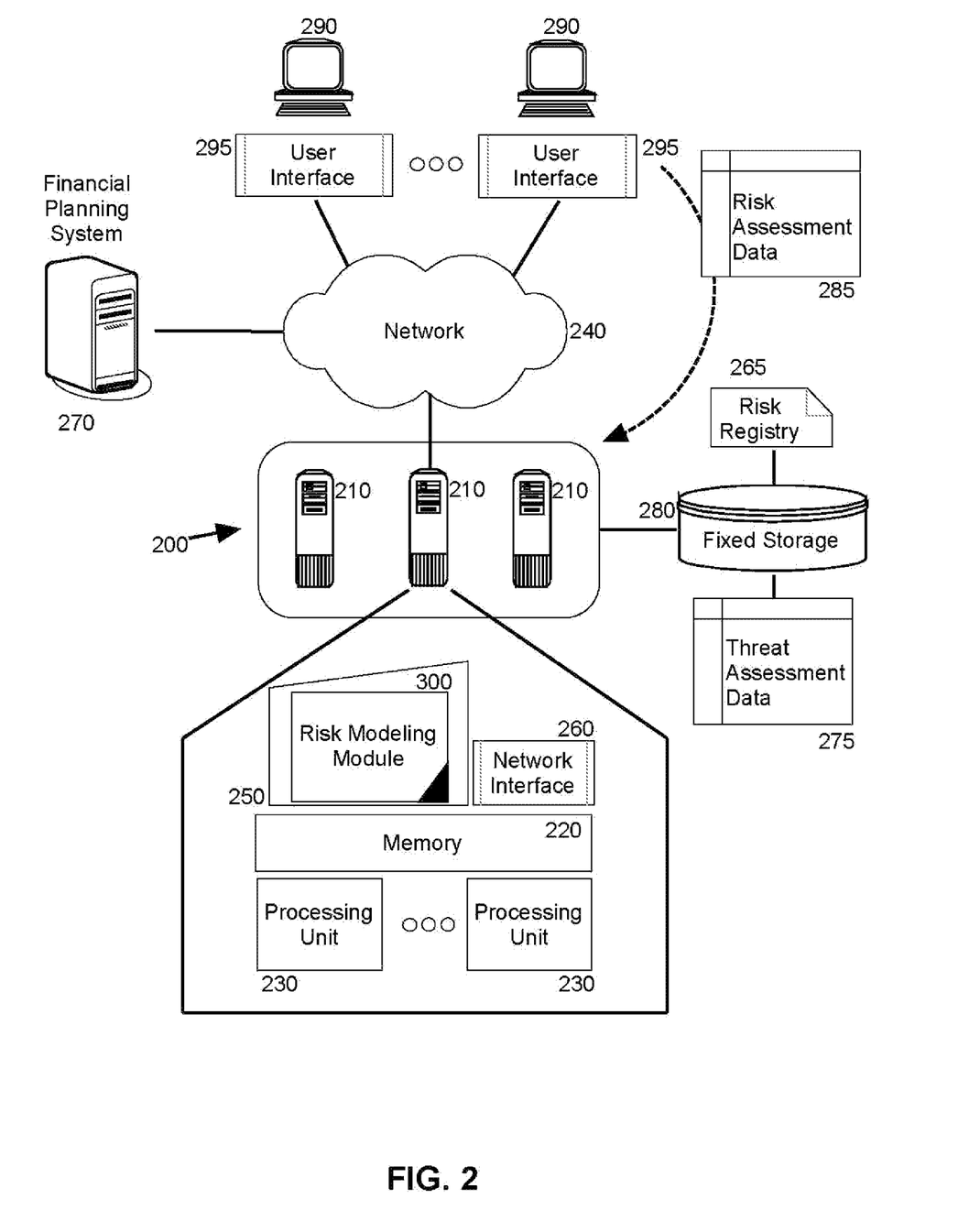
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform risk modeling for cyberspace control deficiencies. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for risk modeling for cyberspace control deficiencies. Specifically, the program instructions during execution receive the specification of an organization from over the data communications network 240 through a user interface 295 to the risk modeling module 300 provided in a corresponding client computing device 290. The program instructions then characterize the specified organization, for instance by querying a data source over the data communications network with an identifier for the organization.

The characterization in hand, the program instructions query threat assessment data 275 in fixed storage 280 with the characterization in order to assemble a set of baseline controls associated with the threats typically encountered by organizations of the same characterization as that of the specified organization. From the baseline controls, the program instructions compute a baseline risk value. Concurrently, the program instructions upload risk assessment data 285 for the specified organization and extracts therefrom, a set of implemented controls for the specified organization. Based upon the threats known to be encountered by the organizations of the same characterization and the controls in the set of implemented controls, the program instructions additionally compute a risk value for the specified organization. Then, the program instructions write the computed risk value to a risk registry 265 in connection with the specified organization.

In addition to writing the computed risk value to the risk registry 265, the program instructions compare the computed risk value to the baseline risk value in order to determine the difference, the difference reflecting a risk deficit. On the condition that the program instructions determine the risk deficit to have exceeded a predetermined threshold value, the program instructions write a flag to the risk registry 265. As well, the program instructions monitor the risk registry in respect to the writing of a new computed risk value so that, optionally, the program instructions perform the comparison process step only upon detecting a change in the computed risk value.

In one aspect of the embodiment, the program instructions receive through the user interface 295 a specified target risk value based upon a hypothetical set of implemented controls of corresponding known cost of implementation. For instance, the target risk value can be a budgeted degree of acceptable monetary risk to the organization. In response, the program instructions replace the computed risk value for the specified organization with the selected target risk value and the program instructions replace the baseline risk value with the previously computed risk value. Then, the program instructions map, for each corresponding one of the threats associated with organizations of the same characterization as the specified organization, identified controls amongst the hypothetical set of the implemented controls.

As such, the program instructions re-compute the computed risk value for the specified organization based upon the mapped controls of the hypothetical set of the implemented controls. Consequently, the program instructions compare the baseline value, as replaced with the previously computed risk value, with the re-computed risk value in order to produce a new risk deficit value from which the program instructions compare the new risk deficit value with a projected cost to implement the hypothetical set of implemented controls. As well, it is determined whether or not the re-computed risk value exceeds the cost of implementation of the hypothetical set of controls by a threshold acceptable margin or so as to produce a predetermined acceptable rate of return on the cost of implementation of the controls.

Finally, the program instructions respond to the new risk deficit value exceeding the projected cost by writing a new flag to the risk registry association with the risk assessment data 285, but otherwise the program instructions writing an update to a database of a financial planning system 270 with the projected cost to implement the hypothetical set of implemented controls. Optionally, the program instructions can engage in a cost-benefit optimization of the hypothetical set of controls by selecting amongst the hypothetical set of controls, one or more of the controls with a high cost of implementation and addressing corresponding threats of comparably low risk value so as to arrive at a target risk value which exceeds the cost of implementation of the optimized hypothetical set of controls by a pre-specified threshold. Optionally, the program instructions can engage in a cost-benefit analysis of the hypothetical set of controls by selecting those controls in which the risk reduction is greater than the cost of their remediation or implementation. Further, an analysis can be made of the resulting set of controls to determine the optimal subset of controls that produce the largest risk reduction for the least cost.

Figure 3:
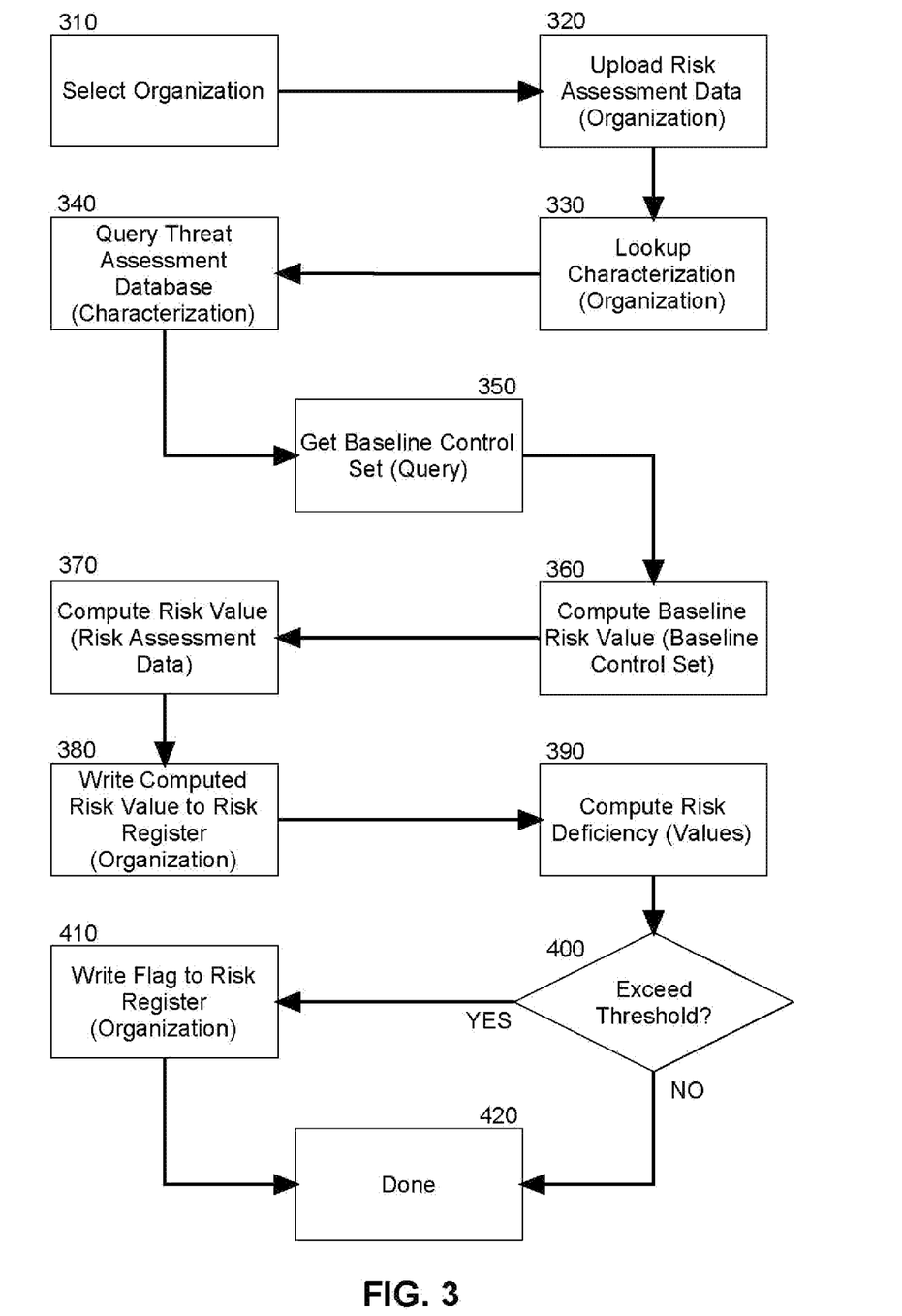

In further illustration of an exemplary operation of the module, FIG. 3 is a flow chart illustrating one of the aspects of the process of FIG. 1. Beginning in block 305, an organization is selected for analysis within a user interface to the risk modeler and in block 320, risk assessment data for the organization is uploaded. Then, in block 330 a lookup is performed in order to characterize the organization. Thereafter, in block 340 the threat assessment database is queried with the characterization in order to receive in response a baseline control set in block 350. From the baseline control set, in block 360 a baseline risk value is computed. Likewise, from the risk assessment data of the organization, in block 370 an organizational risk value is computed.

In block 380, the computed risk value is written to a risk registry in connection with the selected organization. Then, in block 390, the baseline risk value is compared to the organizational risk value in order to compute a risk value deficit. In decision block 400, if the risk value deficit exceeds a predetermined threshold value, in block 410, a flag is written to the risk registry in connection with the selected organization.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for risk modeling for cyberspace control deficiencies comprising:
    establishing a communicative connection with a database storing threat assessment data mapped to different controls, each of the different controls corresponding to one or more threats, each of the different controls having an association in the database with one or more different characterizations of an organization;
    specifying a particular organization for risk modeling and characterizing the particular organization as one of the different characterizations;
    loading into memory from the database a baseline set of controls mapped to respectively different threats for the one of the different characterizations and computing for each corresponding one of the different threats, a baseline risk value from a hypothetical implementation of the set of controls for the different characterizations for the corresponding one of the different threats;

uploading risk assessment data for the particular organization and extracting from the risk assessment data, an implemented set of controls for the particular organization;

mapping for each corresponding one of the threats, identified ones of the implemented set of controls that are mapped to the corresponding one of the threats in the baseline set of controls;

computing a risk value for the particular organization based upon the mapped identified ones of the implemented set of controls and writing the computed risk value to a risk register in the memory in connection with the particular organization;

comparing the baseline risk value to the computed risk value in the risk register to produce a determined risk deficit value for a current state and writing the determined risk deficit value to the risk register; and, responding to the determined risk deficit value exceeding a threshold value by writing a flag to memory in association with the risk assessment data.

2. The method of claim 1, further comprising:

receiving an update to the implemented set of controls; and, responding to the received update by:

updating the computed risk value, and performing a new comparison of the baseline risk value to the computed risk value with the update so as to produce an updated risk deficit value for the current state, and responding to the updated risk deficit value exceeding the threshold value by a threshold value by writing a new flag to the memory in association with the risk assessment data but clearing a previously written flag in the memory on condition that the updated risk deficit value falls below the threshold value.

3. The method of claim 1, wherein a monitoring process monitors the risk register in the memory to detect the writing of the determined risk deficit value and upon detecting the writing of the determined risk deficit value, performs the response to the determined risk deficit value exceeding the threshold value.

4. The method of claim 1, wherein the baseline risk value, computed risk value, and determined risk deficit value, each are dollar values and the threshold value a dollar value.

5. The method of claim 4, wherein the threshold value is proportionate to a dollar value in a budget record for the particular organization.

6. The method of claim 1, further comprising:

selecting a target risk value based upon a hypothetical set of implemented controls, and replacing the computed risk value with the selected target risk value;

replacing the baseline value with the current state value;

mapping for each corresponding one of the treats, identified ones of the hypothetical set of the implemented controls;

re-computing the computed risk value for the specified organization based upon the mapped identified ones of the hypothetical set of the implemented controls and comparing the baseline value as replaced with the current state value with the re-computed risk value in order to produce a new risk deficit value;

comparing the new risk deficit value with a projected cost to implement the hypothetical set of implemented controls; and responding to the new risk deficit value exceeding the projected cost by writing a new flag to the memory in association with the risk assessment data but otherwise writing an update to a financial planning database with the projected cost to implement the hypothetical set of implemented controls.

7. A data processing system adapted for risk modeling for cyberspace control deficiencies, the system comprising:

a host computing platform comprising one or more computers, each with memory and one or processing units including one or more processing cores;

a database storing threat assessment data mapped to different controls, each of the different controls corresponding to one or more threats, each of the different controls having an association in the database with one or more different characterizations of an organization; and, a risk modeling module comprising computer program instructions enabled while executing in the memory of at least one of the processing units of the host computing platform to perform:

specifying a particular organization for risk modeling and characterizing the particular organization as one of the different characterizations;

loading into the memory from the database a baseline set of controls mapped to respectively different threats for the one of the different characterizations and computing for each corresponding one of the different threats, a baseline risk value from a hypothetical implementation of the set of controls for the different characterizations for the corresponding one of the different threats;

uploading risk assessment data for the particular organization and extracting from the risk assessment data, an implemented set of controls for the particular organization;

mapping for each corresponding one of the threats, identified ones of the implemented set of controls that are mapped to the corresponding one of the threats in the baseline set of controls;

computing a risk value for the particular organization based upon the mapped identified ones of the implemented set of controls and writing the computed risk value to a risk register in the memory in connection with the particular organization;

comparing the baseline risk value to the computed risk value in the risk register to produce a determined risk deficit value for a current state and writing the determined risk deficit value to the risk register; and, responding to the determined risk deficit value exceeding a threshold value by writing a flag to the memory in association with the risk assessment data.

8. The system of claim 7, wherein the program instructions further perform:

receiving an update to the implemented set of controls; and, responding to the received update by:

updating the computed risk value, and performing a new comparison of the baseline risk value to the computed risk value with the update so as to produce an updated risk deficit value for the current state, and responding to the updated risk deficit value exceeding the threshold value by a threshold value by writing a new flag to the memory in association with the risk assessment data but clearing a previously written flag in the memory on condition that the updated risk deficit value falls below the threshold value.

9. The system of claim 7, wherein a monitoring process monitors the risk register in the memory to detect the writing of the determined risk deficit value and upon detecting the writing of the determined risk deficit value, performs the response to the determined risk deficit value exceeding the threshold value.

10. The system of claim 7, wherein the baseline risk value, computed risk value, and determined risk deficit value, each are dollar values and the threshold value a dollar value.

11. The system of claim 10, wherein the threshold value is proportionate to a dollar value in a budget record for the particular organization.

12. The system of claim 7, wherein the program instructions further perform:
   selecting a target risk value based upon a hypothetical set of implemented controls, and replacing the computed risk value with the selected target risk value;
   replacing the baseline value with the current state value;
   mapping for each corresponding one of the treats, identified ones of the hypothetical set of the implemented controls;
   re-computing the computed risk value for the specified organization based upon the mapped identified ones of the hypothetical set of the implemented controls and comparing the baseline value as replaced with the current state value with the re-computed risk value in order to produce a new risk deficit value;
   comparing the new risk deficit value with a projected cost to implement the hypothetical set of implemented controls; and
   responding to the new risk deficit value exceeding the projected cost by a threshold value by writing a new flag to the memory in association with the risk assessment data but otherwise writing an update to a financial planning database with the projected cost to implement the hypothetical set of implemented controls.

13. A computing device comprising a non-transitory computer readable storage medium having program instructions stored therein, the instructions being executable by at least one processing core of a processing unit to cause the processing unit to perform a method for risk modeling for cyberspace control deficiencies comprising:
   establishing a communicative connection with a database storing threat assessment data mapped to different controls, each of the different controls corresponding to one or more threats, each of the different controls having an association in the database with one or more different characterizations of an organization;
   specifying a particular organization for risk modeling and characterizing the particular organization as one of the different characterizations;
   loading into memory from the database a baseline set of controls mapped to respectively different threats for the one of the different characterizations and computing for each corresponding one of the different threats, a baseline risk value from a hypothetical implementation of the set of controls for the different characterizations for the corresponding one of the different threats;
   uploading risk assessment data for the particular organization and extracting from the risk assessment data, an implemented set of controls for the particular organization;
   mapping for each corresponding one of the threats, identified ones of the implemented set of controls that are mapped to the corresponding one of the threats in the baseline set of controls;
   computing a risk value for the particular organization based upon the mapped identified ones of the implemented set of controls and writing the computed risk value to a risk register in the memory in connection with the particular organization;
   comparing the baseline risk value to the computed risk value in the risk register to produce a determined risk deficit value for a current state and writing the determined risk deficit value to the risk register; and,
   responding to the determined risk deficit value exceeding a threshold value by writing a flag to memory in association with the risk assessment data.

14. The device of claim 13, wherein the processing unit further performs:
   receiving an update to the implemented set of controls; and,
   responding to the received update by:
   updating the computed risk value, and performing a new comparison of the baseline risk value to the computed risk value with the update so as to produce an updated risk deficit value for the current state, and
   responding to the updated risk deficit value exceeding the threshold value by writing a new flag to the memory in association with the risk assessment data but clearing a previously written flag in the memory on condition that the updated risk deficit value falls below the threshold value.

15. The device of claim 13, wherein a monitoring process monitors the risk register in the memory to detect the writing of the determined risk deficit value and upon detecting the writing of the determined risk deficit value, performs the response to the determined risk deficit value exceeding the threshold value.

16. The device of claim 13, wherein the baseline risk value, computed risk value, and determined risk deficit value, each are dollar values and the threshold value a dollar value.

17. The device of claim 16, wherein the threshold value is proportionate to a dollar value in a budget record for the particular organization.

18. The device of claim 16, wherein the processing unit further performs:
   selecting a target risk value based upon a hypothetical set of implemented controls, and replacing the computed risk value with the selected target risk value;
   replacing the baseline value with the current state value;
   mapping for each corresponding one of the treats, identified ones of the hypothetical set of the implemented controls;
   re-computing the computed risk value for the specified organization based upon the mapped identified ones of the hypothetical set of the implemented controls and comparing the baseline value as replaced with the current state value with the re-computed risk value in order to produce a new risk deficit value;
   comparing the new risk deficit value with a projected cost to implement the hypothetical set of implemented controls; and
   responding to the new risk deficit value exceeding the projected cost by writing a new flag to the memory in association with the risk assessment data but otherwise writing an update to a financial planning database with the projected cost to implement the hypothetical set of implemented controls.

* * * * *